United States Patent
Gudgeon

[11] Patent Number: 6,066,807
[45] Date of Patent: May 23, 2000

[54] ELECTRICAL WIRE AND BOX CONNECTOR

[76] Inventor: Thomas Alan Gudgeon, 4072 Foothill Rd., Santa Barbara, Calif. 93110

[21] Appl. No.: 09/026,818

[22] Filed: Feb. 20, 1998

[51] Int. Cl.$^7$ .......................... H01B 17/00; H01B 17/26; H01B 17/56

[52] U.S. Cl. ................ 174/135; 174/136; 174/152 G; 174/153 G; 174/65 G

[58] Field of Search .................... 174/135, 136, 174/152 R, 65 R, 65 G, 153 G, 152 G, 151; 248/56; 16/2.1, 2.2

[56] References Cited

U.S. PATENT DOCUMENTS

| | | | |
|---|---|---|---|
| D. 339,739 | 9/1993 | Nardi et al. | D13/149 |
| 2,277,637 | 3/1942 | Eby | 174/153 G |
| 4,323,725 | 4/1982 | Muller | 174/65 R |
| 4,323,727 | 4/1982 | Berg | 174/135 |
| 4,494,779 | 1/1985 | Neff et al. | 285/159 |
| 4,808,774 | 2/1989 | Crane | 174/135 |
| 4,864,080 | 9/1989 | Fochler et al. | 174/65 G |
| 5,003,130 | 3/1991 | Danforth et al. | 174/153 G |
| 5,067,685 | 11/1991 | Johnston, Jr. | 248/676 |
| 5,248,850 | 9/1993 | Laney | 174/65 R |
| 5,360,188 | 11/1994 | Condon | 248/56 |

*Primary Examiner*—Kristine Kincaid
*Assistant Examiner*—Mark Olds

[57] ABSTRACT

An electrical wire and box connector (10) removably insertable into an opening of a standard electrical box functioning to hold electrical wire therein. The electrical wire and box connector (10) having a housing cylinder (12) which has a housing cylinder front (12F) connected to a housing cylinder rear (12R) by a housing cylinder middle (12M) having a housing cylinder middle front valley (12MF) and a housing cylinder middle center ridge (12MC) which is positioned adjacent to a rear of the housing cylinder middle front valley (12MF). The housing cylinder middle front valley (12MF) has a diameter similar to a diameter of the opening in the electrical box. The housing cylinder middle center ridge (12MC) has a diameter larger than to the diameter of the opening in the electrical box. The electrical wire and box connector (10) further has a wire holder (14) movably mounted within the housing cylinder (12). The wire holder (14) has a wire holder plate (14A) attached to an inside surface of the housing cylinder middle (12M) by a wire holder stem (14B). The wire holder plate (14A) further has a wire holder channel (14C) therein. An opening formed between the wire holder channel (14C) and the inside surface of the housing cylinder middle (12M) is smaller than the electrical wire. A user inserts the electrical wire into the housing cylinder (12) through the wire holder channel (14C) and pushes the electrical wire and box connector (10) into the opening of the electrical box. The housing cylinder middle front valley (12MF) functions to engage an outer periphery of the opening of the electrical box. The housing cylinder middle center ridge (12MC) functions as a stopper to prevent the user from pushing the electrical wire and box connector (10) completely through the opening of the electrical box.

7 Claims, 2 Drawing Sheets

ELECTRICAL WIRE AND BOX CONNECTOR

FIELD OF THE INVENTION

The present invention relates to electrical wiring connectors. More particularly, the present invention relates to an electrical wire connector for electrical cable.

DESCRIPTION OF THE PRIOR ART

Electrical codes require connectors to be installed in electrical boxes to prevent the electrical wires from pulling out. Typically, prior art connectors comprise a threaded portion in which is inserted through a hole on the electrical box from the outside. A nut is attached to the threaded portion from the inside. Further, a clamping device is used to securely hold the wire after it is inserted. While the prior art connectors function in new construction where the walls are not covered, in remodeling applications having finished walls the prior art connectors require removal of the wall covering adjacent to the electrical box. The repair of the removed wall covering adds significant cost to the remodeling expenses. What is desired is a connector which can be inserted from the inside out and securely fastens the electrical wire in place. Further, it should be possible to run the electrical wire through the hole in the electrical box then install the connector.

Numerous innovations for Electrical Wire and Box Connector have been provided in the prior art that are described as follows. Even though these innovations may be suitable for the specific individual purposes to which they address, they differ from the present invention as hereinafter contrasted.

In U.S. Pat. No. 5,248,850, titled Electrical Box Connector Conduit, invented by Robbye J. Laney an electrical box connector conduit is fixedly mounted between adjacent electrical boxes through aligned box bores. The conduit structure includes a central conduit member having first and second abutment flanges mounted fixedly to the first and second ends of the conduit member. The conduit member is internally threaded to threadedly receive first and second externally threaded tubes. The first and second tubes include first and second tube flanges, with respective side walls of the respective boxes captured between a respective tube flange and abutment flange to direct electrical cable through the conduit structure between the electrical boxes.

The patented invention differs from the present invention because the patented invention is an electrical box connector conduit is fixedly mounted between adjacent electrical boxes. The patented invention includes a central conduit member having first and second abutment flanges mounted fixedly to the first and second ends of the conduit member. The patented invention is of rigid construction.

In U.S. Pat. No. D339,793, titled Electrical Box Connector Coupling, invented by Pierre Nardi an ornamental design for an electrical box connector coupling, as shown.

The patented invention differs from the present invention because the patented invention is an ornamental design for an electrical box connector coupling. The patented invention lacks features similar to the present invention. The patented invention is of rigid construction and is secured into position by a retaining nut on one side of the electrical outlet box and on the other side by a flange. A machine screw is used to secure the romex cable.

In U.S. Pat. No. 5,067,685, titled Modular Electrical Box Mounting System, invented by Robert G. Johnston, Jr., an invention constitutes to a modular electrical connector box mounting system particularly adapted for securable, re-positionable, suspension upon a roof-like structure, for use in conjunction with other suspended equipment, such as air conditioning equipment, which is suspended upon an I-beam and a related truss structure.

The patented invention differs from the present invention because the patented invention is a modular electrical connector box mounting system. The patented invention lacks features similar to the present invention.

In U.S. Pat. No. 4,864,080, titled Terminator Connector Fitting for Electrical Box and Conduit System, invented by Helmut P. Fochler, Joseph Urkewich and Daryl J. Sauerbrei, a terminator fitting useful for connecting corrugated tubing to an electrical outlet box and including a cylindrical collar having first and second ends and a rib projecting radially inwardly from the collar for engaging an external rib on corrugated tubing placed within the collar. The collar carries circumferentially-spaced, axially projecting projections on one of its ends, with each such projection including a wedge-shaped free end portion. Each wedge-shaped end portion is joined to the first end of the collar by a web portion. The web portion, free end portion and collar define a groove for engaging the side wall of an outlet box when the arcuate projections are forced through an opening in the box to secure the fitting in the box. A plurality of blocking flanges are included in the terminator fitting with each blocking flange extending in a circumferential direction from a lateral edge of one of the wedge-shaped free end portions.

The patented invention differs from the present invention because the patented invention is a terminator fitting useful for connecting corrugated tubing to an electrical outlet box. The patented invention has a central aperture. Wedge shaped projections protrude radially on one end. The wedge shaped projections deform as the terminator fitting is pushed through an opening in an electrical outlet box, then return to their original shape which restrains the patented invention from withdrawing from the opening.

In U.S. Pat. No. 4,494,779, titled Connector Fitting for Electrical Box, invented Steven W. Neff, and Richard J. Borsh a connector fitting by which corrugated conduit can be quickly connected to an electrical box. The fitting includes a pair of hingedly interconnected semi-cylindrical collars. Two spaced, box engaging projections are carried on, and extend axially from each of the semi-cylindrical collars, and the inner side of each semi-cylindrical collar is grooved to mate with and engage corrugations carried exteriorly on a corrugated conduit to be connected to an electrical box by the use of the fitting. Each of the box engaging projections includes a wedge shaped free end portion and a web portion by which the wedge shaped free end portion is connected to one of the respective collars. Each wedge-shaped end portion, its associated web portion and the collar to which the web portion is connected define an arcuate channel or relief for receiving and engaging the portion of the wall of an electrical box which surrounds an opening into which the connector fitting is snapped.

The patented invention differs from the present invention because the patented invention is a rigid device. The patented invention has two flexible tab members which contract to permit insertion into an opening then spring back into position restraining the patented invention. A threaded portion engages the corrugated conduit to securely attach the corrugated conduit to the electrical box. The patented invention is not adapted to romex wire.

Numerous innovations for Electrical Wire and Box Connector have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a housing cylinder which is deformable. The housing cylinder has a housing cylinder front and a housing cylinder rear joined by a housing cylinder middle. The cylinder front, housing cylinder rear, and housing cylinder middle are generally of cylindrical cross section and have a central aperture therethrough. A wire holder is attached to an interior wall of the housing cylinder middle. The wire holder is biased to spring away from the attachment point. When an electrical cable is pushed through the central aperture in one direction, the wire holder permits passage. Subsequently when the electrical cable is pulled in the reverse direction, the wire holder is jammed against the electrical cable and the wall of the aperture preventing the electrical cable from being withdrawn. The present invention is inserted into an opening in an electrical outlet box by deforming until it is small enough to be inserted into the whereupon the user releases the connector and it springs into its original shape filling the opening.

The types of problems encountered in the prior art are adding electrical wires to electrical boxes during remodeling requires the removal of the interior wall covering adjacent to the electrical box to install an electrical wire connector.

In the prior art, unsuccessful attempts to solve this problem were attempted namely the addition of electrical wire to the electrical box using a standard connector which comprises a threaded part and a nut. However, the problem was solved by the present invention because it is inserted from the inside the electrical box and is self securing.

The present invention went contrary to the teaching of the art because the present invention is inserted from the inside out.

The present invention solved a long felt need for a connector to be used when remodeling or in new construction that is easy to install and has a positive grip on an electrical wire.

Accordingly, it is an object of the present invention to provide an electrical wire connector that can be inserted into an electrical box from either side.

More particularly, it is an object of the present invention to provide an electrical connector that snaps in place and secures an electrical wire without the use of a screw clamp.

In keeping with these objects, and with others which will become apparent hereinafter, one feature of the present invention resides, briefly stated, in an electrical connector which can be used in new and remodeling construction without disturbing the interior walls.

When the electrical wire and box connector is designed in accordance with the present invention, an electrical wire can be inserted from either direction.

In accordance with another feature of the present invention, the electrical wire and box connector is inserted from either the inside or outside of an electrical box.

Another feature of the present invention is that a housing cylinder has a housing cylinder front connected to a housing cylinder rear by a housing cylinder middle.

Yet another feature of the present invention is that the housing cylinder, housing cylinder rear, and the housing cylinder middle have a central aperture therethrough.

Still another feature of the present invention is that a series of valleys function to hold the electrical wire and box connector securely within the electrical box hole.

Yet still another feature of the present invention is that wire holder securely fastens an electrical wire within the central aperture.

Still yet another feature of the present invention is that wire holder channel grippers function to prevent the electrical wire from slipping.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—electrical wire and box connector (10)
12—housing cylinder (12)
12A—housing cylinder slot (12A)
12F—housing cylinder front (12F)
12R—housing cylinder rear (12R)
12M—housing cylinder middle (12M)
12MF—housing cylinder middle front valley (12MF)
12MR—housing cylinder middle rear valley (12MR)
12MC—housing cylinder middle center ridge (12MC)
14—wire holder (14)
14A—wire holder plate (14A)
14AA—wire holder plate support (14AA)
14B—wire holder stem (14B)
14C—wire holder channel (14C)
14CA—wire holder channel first gripper (14CA)
14CB—wire holder channel second gripper (14CB)
14CC—wire holder channel third gripper (14CC)

DESCRIPTION OF THE PREFERRED EMBODIMENT

Figure 1:
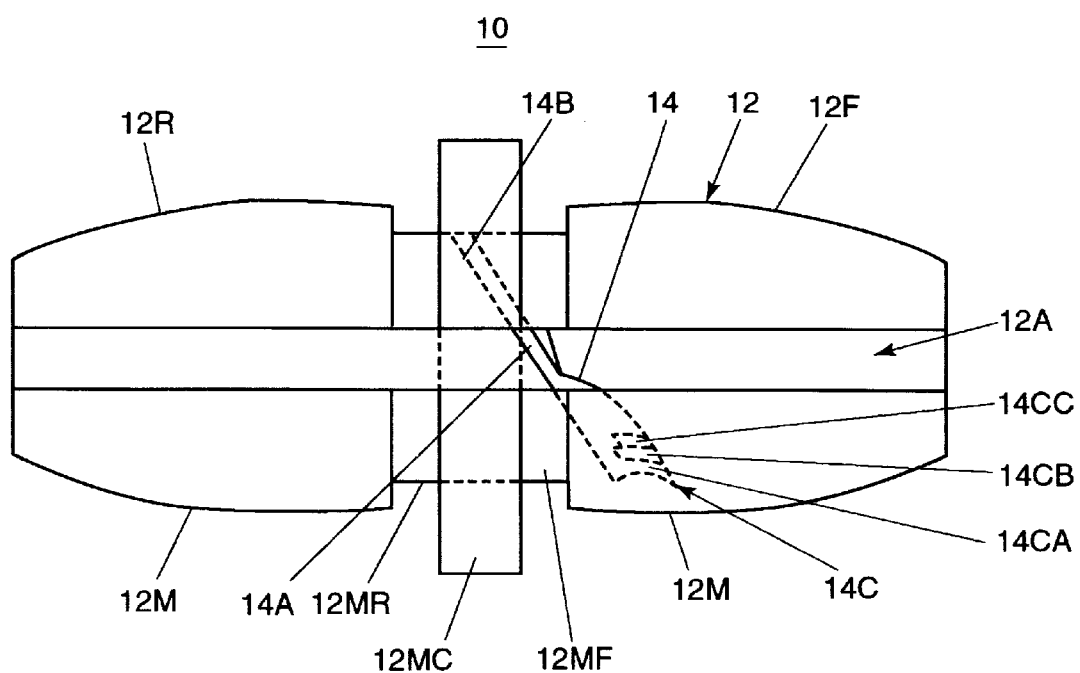
FIG. 1 is a side view of an electrical wire and box connector (10).

Firstly, referring to FIG. 1 which is a side view of an electrical wire and box connector (10). The electrical wire and box connector (10) is removably insertable into an opening of a standard electrical box. The electrical wire and box connector (10) functions to hold an electrical wire therein. The electrical wire and box connector (10) comprise a housing cylinder (12). The housing cylinder (12) comprises a housing cylinder front (12F) which is connected to a housing cylinder rear (12R) by a housing cylinder middle (12M). The housing cylinder middle (12M) has a housing cylinder middle front valley (12MF) and a housing cylinder middle center ridge (12MC) which is positioned adjacent to a rear of the housing cylinder middle front valley (12MF). The housing cylinder middle front valley (12MF) which comprises a diameter similar to a diameter of the opening in the electrical box. The housing cylinder middle center ridge (12MC) comprises a diameter larger than the diameter of the opening in the electrical box.

The housing cylinder (12) further comprises a housing cylinder slot (12A) longitudinally disposed therein which functions to allow the user to squeeze the sides of the housing cylinder (12) which reduces the diameter sufficiently to facilitate insertion into the opening of the electrical box.

The cylinder middle (12M) further comprises a housing cylinder middle rear valley (12MR) which is positioned adjacent to a rear of the housing cylinder middle center ridge (12MC). The housing cylinder middle rear valley (12MR) comprises a diameter similar to the diameter of the opening of the electrical box. The housing cylinder middle rear valley (12MR) functions to engage an outer periphery of the opening of the electrical box.

The electrical wire and box connector (10) further comprises a wire holder (14) which is movably mounted within the housing cylinder (12). The wire holder (14) comprises a wire holder plate (14A) which is attached to an inside surface of the housing cylinder middle (12M) by a wire holder stem (14B). The wire holder (14) is acutely angled toward the housing cylinder front (12F). The wire holder plate (14A) further comprises a wire holder channel (14C) therein.

The wire holder channel (14C) comprises at least one wire holder channel first gripper (14CA) concentrically positioned there around in the wire holder plate (14A). The at least one wire holder channel gripper comprises a wire holder channel first gripper (14CA) having a small diameter, a wire holder channel second gripper (14CB) having a medium diameter, and a wire holder channel third gripper (14CC) having a large diameter. The at least one wire holder channel first gripper (14CA) functions to hold various size electrical wire in place.

An opening is formed between the wire holder channel (14C) and the inside surface of the housing cylinder middle (12M) is smaller than the electrical wire. A user inserts the electrical wire into the housing cylinder (12) through the wire holder channel (14C) and pushes the electrical wire and box connector (10) into the opening of the electrical box. The housing cylinder middle front valley (12MF) functions to engage an outer periphery of the opening of the electrical box. The housing cylinder middle center ridge (12MC) functions as a stopper to prevent the user from pushing the electrical wire and box connector (10) completely through the opening of the electrical box.

The wire holder plate (14A) further comprises a wire holder plate support (14AA) which is securely attached to the inner surface of the housing cylinder middle (12M) and securely attached to the wire holder stem (14B) and attached to the wire holder plate (14A). The wire holder plate support (14AA) functions as a reinforcement means. The wire holder plate support (14AA) comprises a tapered configuration having a wide end securely attached to the inner surface of the housing cylinder middle (12M).

The electrical wire and box connector (10) is manufactured from a material selected from a group consisting of plastic, plastic composite, rubber, rubber composite, metal and metal alloy.

Figure 2:
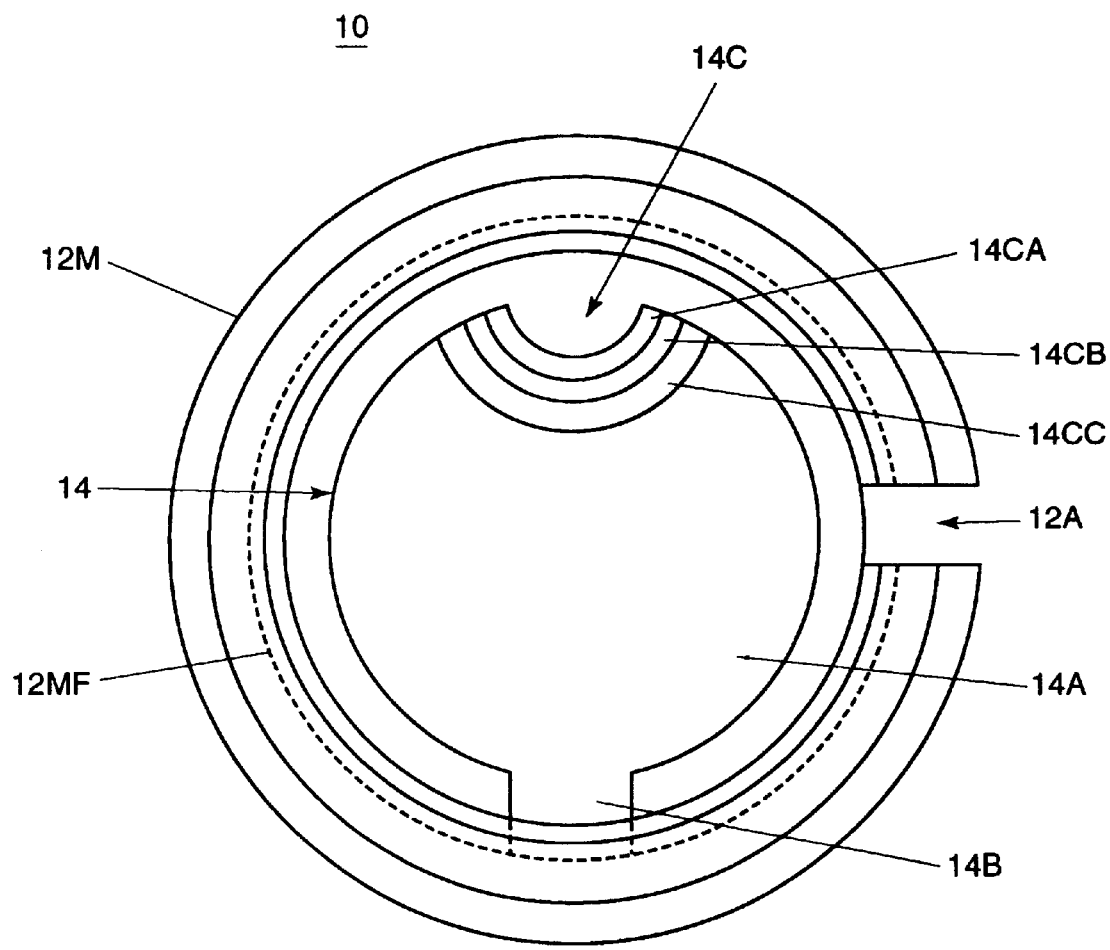
FIG. 2 is a front view of an electrical wire and box connector (10).

Lastly, referring to FIG. 2 which is a front view of an electrical wire and box connector (10). The electrical wire and box connector (10) is removably insertable into the opening of the standard electrical box functioning to hold electrical wire therein. The electrical wire and box connector (10) comprise the housing cylinder (12). The housing cylinder (12) comprises the housing cylinder front (12F) which is connected to the housing cylinder rear (12R) by the housing cylinder middle (12M). The housing cylinder middle (12M) has the housing cylinder middle front valley (12MF) and the housing cylinder middle center ridge (12MC) which is positioned adjacent to the rear of the housing cylinder middle front valley (12MF). The housing cylinder middle front valley (12MF) comprises a diameter similar to the diameter of the opening in the electrical box. The housing cylinder middle center ridge (12MC) comprises a diameter larger than the diameter of the opening in the electrical box.

The housing cylinder (12) further comprises the housing cylinder slot (12A) longitudinally which is disposed therein. The housing cylinder slot (12A) functions to allow the user to squeeze sides of the housing cylinder (12), which reduces the diameter of the housing cylinder (12), facilitating insertion into the opening of the electrical box.

The cylinder middle (12M) further comprises the housing cylinder middle rear valley (12MR) which is positioned adjacent to the rear of the housing cylinder middle center ridge (12MC). The housing cylinder middle rear valley (12MR) comprises a diameter similar to the diameter of the opening of the electrical box. The housing cylinder middle rear valley (12MR) functions to engage an outer periphery of the opening of the electrical box.

The electrical wire and box connector (10) further comprises the wire holder (14) which is movably mounted within the housing cylinder (12). The wire holder (14) comprises the wire holder plate (14A) which is attached to the inside surface of the housing cylinder middle (12M) by the wire holder stem (14B). The wire holder (14) is acutely angled toward the housing cylinder front (12F). The wire holder plate (14A) further comprises the wire holder channel (14C) therein.

The wire holder channel (14C) comprises at least one wire holder channel first gripper (14CA) concentrically positioned there around in the wire holder plate (14A). The at least one wire holder channel gripper comprises the wire holder channel first gripper (14CA) having a small diameter, the wire holder channel second gripper (14CB) having a medium diameter, and the wire holder channel third gripper (14CC) having a large diameter. The at least one wire holder channel first gripper (14CA) functions to hold various size electrical wire in place.

An opening is formed between the wire holder channel (14C) and the inside surface of the housing cylinder middle (12M) which is smaller than the electrical wire. A user inserts the electrical wire into the housing cylinder (12) through the wire holder channel (14C) and pushes the electrical wire and box connector (10) into the opening of the electrical box. The housing cylinder middle front valley (12MF) functions to engage an outer periphery of the opening of the electrical box. The housing cylinder middle center ridge (12MC) functions as a stopper to prevent the user from pushing the electrical wire and box connector (10) completely through the opening of the electrical box.

The wire holder plate (14A) further comprises the wire holder plate support (14AA) which is securely attached to the inner surface of the housing cylinder middle (12M) and securely attached to the wire holder stem (14B) and attached to the wire holder plate (14A). The wire holder plate support (14AA) functions as a reinforcement means. The wire holder plate support (14AA) comprises a tapered configuration having a wide end securely attached to the inner surface of the housing cylinder middle (12M).

It will be understood that each of the elements described above, or two or more together, may also find a useful application in other types of constructions differing from the type described above.

While the invention has been illustrated and described as embodied in an Electrical Wire and Box Connector, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. An electrical wire and box connector (10) removably insertable into an opening of an electrical box functioning to hold electrical wire therein, the electrical wire and box connector (10) comprising:

A) a housing cylinder (12) which comprises a housing cylinder front (12F) connected to a housing cylinder rear (12R) by a housing cylinder middle (12M) having a housing cylinder middle front valley (12MF) and a housing cylinder middle center ridge (12MC) which is positioned adjacent to a rear of the housing cylinder middle front valley (12MF), the housing cylinder middle front valley (12MF) comprises a diameter similar to a diameter of the opening in the electrical box, the housing, cylinder middle center ridge (12MC) comprises a diameter larger than to the diameter of the opening in the electrical box; and B) a wire holder (14) movably mounted within the housing cylinder (12), the wire holder (14) comprises a wire holder plate (14A) attached to an inside surface of the housing cylinder middle (12M) by a wire holder stem (14B), the wire holder plate (14A) further comprises a wire holder channel (14C) therein, an opening formed between the wire holder channel (14C) and the inside surface of the the housing cylinder middle (12M) is smaller than the electrical wire.

2. The electrical wire and box connector (10) as described in claim 1, wherein the housing cylinder (12) further comprises a housing cylinder slot (12A) longitudinally disposed, therein which functions to allow the user to squeeze sides of the housing cylinder (12), reducing the diameter, facilitating insertion into the opening of the electrical box.

3. The electrical wire and box connector (10) as described in claim 1, wherein the housing cylinder middle (12M) further comprises a housing cylinder middle rear valley (12MR) positioned adjacent to a rear of the housing cylinder middle center ridge (12MC), the housing cylinder middle rear valley (12MR) comprises a diameter similar to the diameter of the opening of the electrical box, the housing cylinder middle rear valley (12MR) functions to engage an outer periphery of the opening of the electrical box, the housing cylinder middle center ridge (12MC).

4. The electrical wire and box connector (10) as described in claim 1, wherein the holder channel (14C) comprises at least one wire holder channel gripper concentrically positioned there around in the wire holder plate (14A), the at least one wire holder channel gripper functions to hold differeing size electrical wire in place.

5. The electrical wire and box connector (10) as described in claim 1, wherein at least one wire holder channel gripper comprises a wire holder channel first gripper (14CA) having a small diameter, a wire holder channel second gripper (14CB) having a medium diameter, and a wire holder channel third gripper (14CC) having a large diameter.

6. The electrical wire and box connector (10) as described in claim 1, wherein the wire holder (14) is acutely angled toward the housing cylinder front (12F).

7. The electrical wire and box connector (10) as described in claim 1 is manufactured from a material selected from a group consisting of plastic, plastic composite, rubber, rubber composite, metal and metal alloy.

* * * * *